US006533950B1

(12) United States Patent
Shum et al.

(10) Patent No.: US 6,533,950 B1
(45) Date of Patent: Mar. 18, 2003

(54) NON-HOMOGENEOUS LAMINATE MATERIAL FOR SUSPENSION WITH FLEXURE MOTION LIMITER

(75) Inventors: Victor Wing-Chun Shum, San Jose, CA (US); Randall George Simmons, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 09/259,888

(22) Filed: Feb. 27, 1999

(51) Int. Cl.[7] ............................................. B44C 1/22
(52) U.S. Cl. ..................... 216/13; 216/41; 216/20; 360/104; 360/105; 360/244; 360/245.9; 29/603.03; 29/603.06; 29/896.9
(58) Field of Search ................................ 360/104, 105, 360/245.9, 244; 216/20, 41, 13; 29/603.03, 896.6, 603.06

(56) References Cited

U.S. PATENT DOCUMENTS

| 4,716,259 A | * | 12/1987 | Tokura et al. ............. 174/68.5 |
| 4,906,803 A | * | 3/1990 | Albrechta et al. ........... 174/254 |
| 4,996,623 A | * | 2/1991 | Erpelding et al. .......... 360/105 |
| 5,598,307 A | * | 1/1997 | Bennin ...................... 360/104 |
| 5,701,218 A | * | 12/1997 | Boutaghou ................. 360/104 |
| 5,712,749 A | * | 1/1998 | Gustafson .................. 360/104 |
| 5,959,807 A | * | 9/1999 | Jurgenson .................. 360/104 |
| 6,046,883 A | * | 4/2000 | Miller ........................ 360/104 |

FOREIGN PATENT DOCUMENTS

| GB | 2295918 A | * | 12/1996 | ................. 5/48 |
| WO | WO 97/36290 | * | 10/1997 | ................. 5/55 |

* cited by examiner

Primary Examiner—Randy Gulakowski
(74) Attorney, Agent, or Firm—Douglas R. Millett; Bracewell & Patterson, L.L.P.

(57) ABSTRACT

An integrated lead suspension is formed from a laminate of three materials in a variety of configurations having from three to five layers. The materials are stainless steel, polyimide and copper. Each layer is essentially homogeneous, but may be formed with one or more holes or voids prior to the formation of the laminate. After the copper layer is etched to form a tab which overhangs the steel layer, the suspension is welded to a load beam. The load beam prevents the downward motion of the suspension. The tab acts as a flexure motion limiter for upward motion of the suspension. The voids allow a precise amount of polyimide undercut between the steel and copper layers which otherwise could not be achieved.

18 Claims, 2 Drawing Sheets

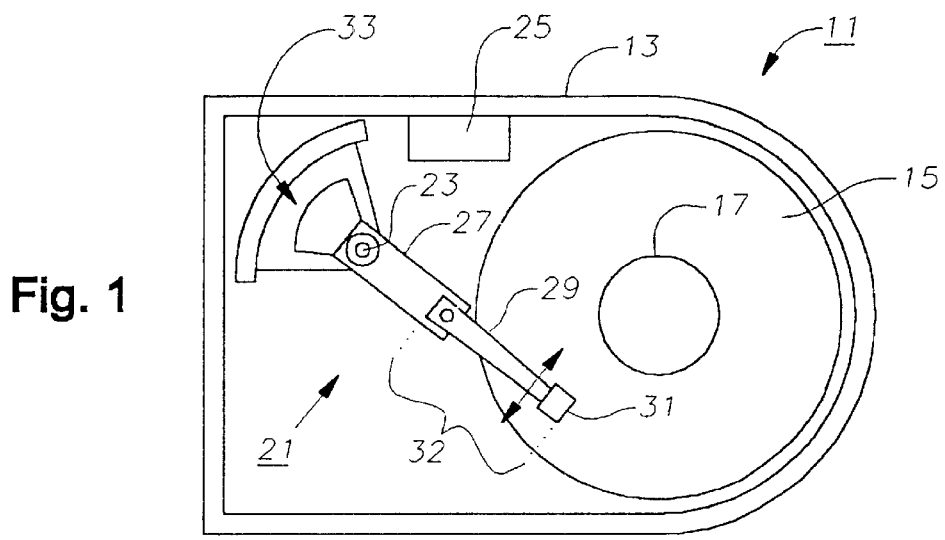
Fig. 1
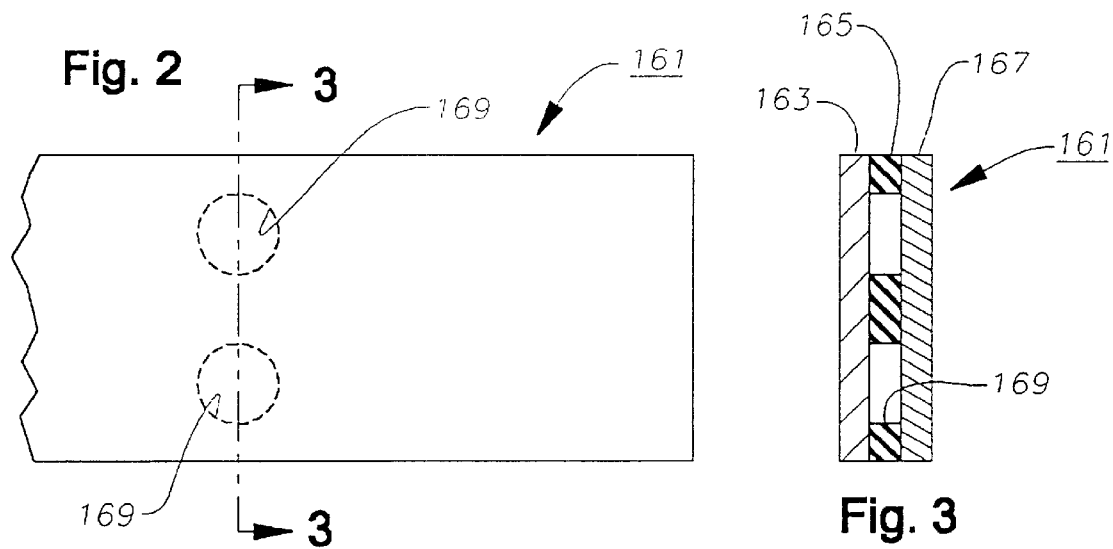
Fig. 2
Fig. 3
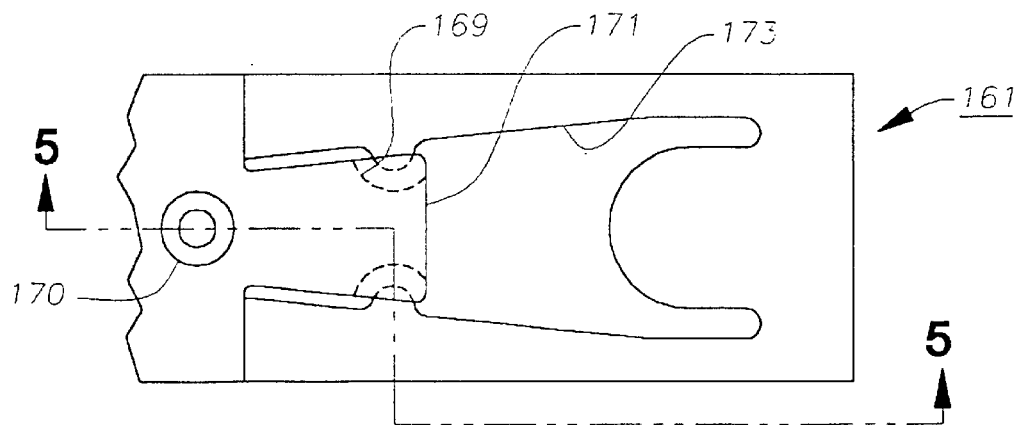
Fig. 4

NON-HOMOGENEOUS LAMINATE MATERIAL FOR SUSPENSION WITH FLEXURE MOTION LIMITER

BACKGROUND OF THE INVENTION

1. Technical Field

This invention relates in general to integrated lead suspensions for hard disk drives and in particular to fabricating and applying non-homogenous laminate materials to an integrated lead suspension with a flexure motion limiter.

2. Background Art

In hard disk drive manufacturing, one type of head gimbal assembly has an integrated lead suspension (ELS). An ILS is typically formed by laminating several layers of material together and then selectively etching the layers to achieve a desired architecture. Alternatively, the layers may be formed by plating them on top of one another. These layers usually comprise at least one of each of the following: a stainless steel substrate or support layer, an insulation layer such as a polyimide, and a conductor layer such as copper. An ILS with a bent lead type design must be etched on both sides to clear the polyimide on the bent lead. This step requires additional process time and adds cost to the suspension.

For an ILS with a pico format magnetic read/write head or slider, a flexure motion limiter is often required for damage prevention and dynamic performance. The flexure motion limiter requires forming the stainless steel on either the flexure or the load beam. The formed part is then interleaved with the unformed part at assembly to provide motion limitation on the flexure. This extra forming step and assembly interleave step will add cost and sometimes increase the height profile of the ILS. An improved method for manufacturing integrated lead suspensions is needed to address these issues.

DISCLOSURE OF THE INVENTION

An integrated lead suspension is formed from a laminate of three materials in a variety of configurations having from three to five layers. The materials are stainless steel, polyimide and copper. Each layer is essentially homogeneous, but may be formed with one or more holes or voids prior to the formation of the laminate. After the copper layer is etched to form a tab which overhangs the steel layer, the suspension is welded to a load beam. The load beam prevents the downward motion of the suspension. The tab acts as a flexure motion limiter for upward motion of the suspension. The voids allow a precise amount of polyimide undercut between the steel and copper layers which otherwise could not be achieved.

BRIEF DESCRIPTION OF THE DRAWINGS

FIG. 1 is a schematic drawing of a hard disk drive.

FIG. 2 is a plan view of a laminate used to form a suspension shown prior to etching.

FIG. 3 is a sectional end view of the laminate of FIG. 2 taken along the line 3—3 of FIG. 2.

FIG. 4 is a plan view of a suspension which has been etched from the laminate of FIG. 2 and is constructed in accordance with the invention.

BEST MODE FOR CARRYING OUT THE INVENTION

Figure 5:
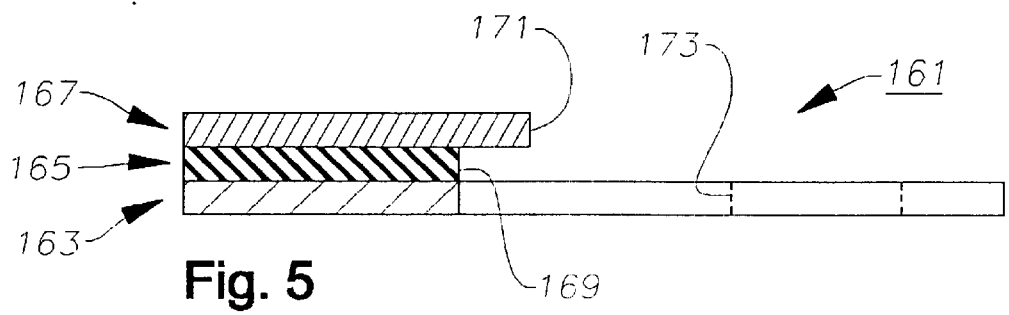
FIG. 5 is a sectional side view of the suspension of FIG. 4 taken along the line 5—5 of FIG. 4.

Referring to FIG. 1, a schematic drawing of an information storage system comprising a magnetic hard disk drive 11 is shown. Drive 11 has a base 13 containing a plurality of stacked, parallel magnetic disks 15 (one shown) which are closely spaced apart. Disks 15 are rotated by a motor located therebelow about a central drive hub 17. An actuator 21 is pivotally mounted to base 13 about a pivot assembly 23. A controller 25 is mounted to base 13 for selectively moving actuator 21 as will be described below.

Actuator 21 has a mounting support 27, a pair of parallel, cantilevered load beams or integrated lead suspensions 29 extending from mounting support 27, and a slider 31 having at least one magnetic read/write head secured to each suspension 29 for magnetically reading data from or magnetically writing data to disks 15. The union of a suspension 29 and a slider 31 forms a head gimbal assembly 32. Suspensions 29 have a spring-like quality which biases or maintains them in parallel relationship relative to one another. A motor assembly 33 having a conventional voice coil motor is also mounted to pivot assembly 23 opposite sliders 31. Movement of actuator 21 (indicated by arrows) moves sliders 31 radially across tracks on the disks 15 until the heads on sliders 31 settle on the target tracks.

Referring now to FIGS. 2–7, an integrated lead suspension 161 comprises a laminate of three materials: a support layer of stainless steel 163, a dielectric layer of polyimide 165, and a conductive layer of copper 167. The laminate of suspension 161 can be formed by selectively etching away different layers, or by selectively plating and building the laminate layer by layer. In one embodiment, polyimide 165 is etched by hot plasma, while steel 163 and copper 167 are etched with a conventional wet chemical etching process.

Prior to the formation of the laminate (FIGS. 2 and 3), polyimide 165 is preformed with one or more circular holes or voids 169 so that it is no longer homogenous. The circular shape of voids 169 is critical only to achieve the proper interference between the layers of the laminate. Voids 169 may be formed by prestamping or pre-etching polyimide 165. After voids 169 are formed in polyimide 165, the laminate of suspension 161 is made as described above, including a weld 170 between steel 163 and load beam 177. Next, copper 167 is etched to form a tab 171 (FIGS. 4 and 5) which contains part of voids 169, and steel 163 is etched to form feature 173. As shown between FIGS. 2 and 4, voids 169 in polyimide 165 may be enlarged by etching during these latter steps. Voids 169 enable the clearance of polyimide 165 between features 171 and 173.

Figure 6:
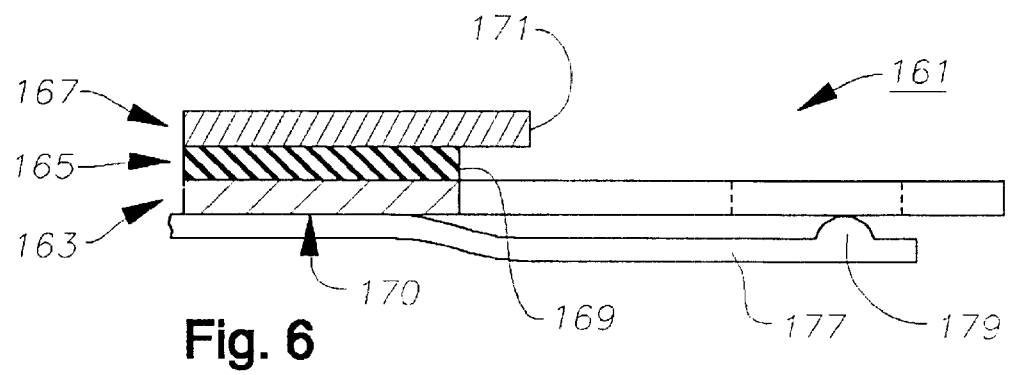
FIG. 6 is a sectional side view of the suspension of FIG. 4 after installation in the hard disk drive of FIG. 1.
Figure 7:
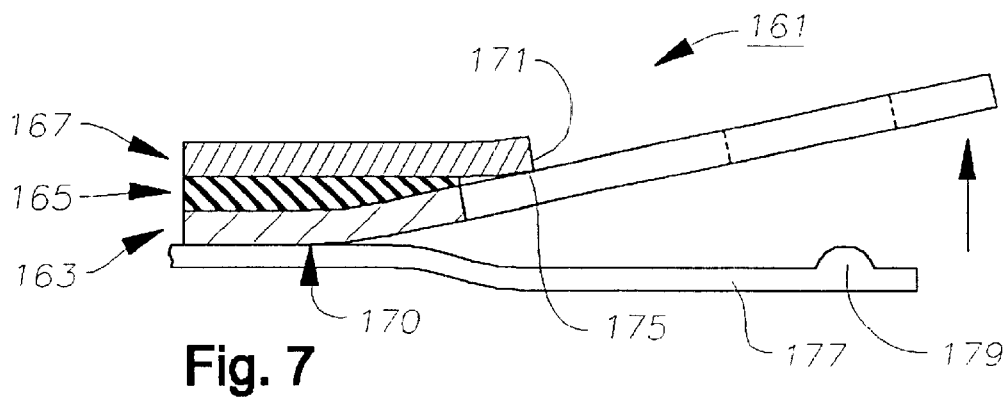
FIG. 7 is a sectional side view of the suspension of FIG. 6 in operation.

In operation, suspension 161 is permanently welded on a support structure such as load beam 177. The assembled structure with the slider (a head gimbal assembly) is permanently installed on load beam 177 with weld 170. Load beam 177 has a mounting support 179 which prevents the downward motion of steel 163 (FIG. 6). As shown in FIG. 7, tab 171 acts as a flexure motion limiter for the upward motion of steel 163 when steel 163 contacts edge 175 on tab 171. Voids 169 allow a precise amount of polyimide undercut between steel 163 and copper 167 which otherwise could not be achieved.

The invention has many advantages. The voids allow the removal of dielectric material from an area beneath the conductors to simplify processing and reduce the cost of the suspensions. If the suspension is built using the plating method, the voids expedite the process by allowing both sides of the steel to be plated simultaneously in a single step. The voids help create other features which are smaller than would otherwise be available by conventional methods. The voids facilitate the formation of flexure motion limiters for the suspensions by allowing a precise amount of polyimide undercut between the steel and copper layers which otherwise could not be achieved. This feature achieves a lower profile head gimbal assembly without forming or interleaving of components at assembly. This feature also extends the capability of the integrated lead suspension process while lowering manufacturing costs. The voids can also give a suspension lower pitch and roll stiffness, lower mass and better static attitude control under varying temperature and humidity conditions.

While the invention has been shown or described in only some of its forms, it should be apparent to those skilled in the art that it is not so limited, but is susceptible to various changes without departing from the scope of the invention. For example, as set forth in the appended claims, the layers of the integrated lead suspension may comprise a metal support layer, a dielectric layer, and a conductor layer.

We claim:

1. A method for manufacturing an integrated lead suspension for a hard disk drive, comprising:
   (a) providing a metal support layer, a dielectric layer, and a conductor layer;
   (b) forming a void in the dielectric layer; then
   (c) laminating the dielectric layer between the support layer and the conductor layer to form a laminate;
   (d) etching the conductor layer of the laminate of step (c) to form an extension portion which extends beyond the void, defining a recess between the conductor layer and the support layer; and then, in operation:
   (e) limiting flexing movement of the support layer toward the conductor layer by contact with the extension portion, wherein the support layer is allowed some range of flexing motion by the void.

2. The method of claim 1, further comprising the step of permanently mounting the etched laminate of step (d) to a load beam.

3. The method of claim 1, further comprising the step of welding the support layer of the etched laminate of step (d) to a load beam.

4. The method of claim 3, further comprising the step of supporting the support layer with a mounting support on the load beam to prevent motion of the support layer in an opposite direction to the conductor layer.

5. The method of claim 1 wherein step (d) comprises etching each of the dielectric and support layers.

6. The method of claim 1, further comprising the steps of forming the support layer from steel, forming the dielectric layer from a polymer, and forming the conductor layer from copper.

7. The method of claim 1 wherein step (b) comprises forming a plurality of circular voids in the dielectric layer.

8. A method for manufacturing an integrated lead suspension for a hard disk drive, comprising:
   (a) providing a metal support layer, a dielectric layer, and a conductor layer;
   (b) forming a plurality of voids in the dielectric layer; then
   (c) laminating the dielectric layer between the support layer and the conductor layer to form a laminate;
   (d) etching the conductor and support layers to form desired shapes, and etching the conductor layer of the laminate of step (c) to form a terminal end which is beyond the voids, thereby defining recesses beneath the terminal end;
   (e) permanently mounting the etched laminate of step (d) to a load beam; and then, in operation:
   (f) limiting flexing movement of the support layer toward the conductor layer by contact with the terminal end, wherein the support layer is allowed some range of flexing motion by the voids.

9. The method of claim 8 wherein step (e) comprises welding the support layer of the etched laminate of step (d) to a load beam.

10. The method of claim 8, further comprising the step of supporting the support layer with a mounting support on the load beam to prevent motion of the support layer in an opposite direction to the conductor layer.

11. The method of claim 8, further comprising the steps of forming the support layer from steel, forming the dielectric layer from a polymer, and forming the conductor layer from copper.

12. An integrated lead suspension for a hard disk drive, comprising:
   a metal support layer;
   a conductor layer;
   a dielectric layer located between the support and conductor layers to form a laminate, the dielectric layer having a preformed void;
   the conductor layer having a terminal end which terminates beyond the void a selected distance to form a recess; and wherein
   the support layer is allowed a limited range of flexure motion toward the conductor layer at the recess, and wherein the motion of the support layer is limited by contact with the terminal end.

13. The suspension of claim 12 wherein the laminate is permanently mounted to a load beam.

14. The suspension of claim 12 wherein the support layer of the laminate is welded to a load beam.

15. The suspension of claim 14 wherein the support layer is supported by a mounting support on the load beam to prevent motion of the support layer in an opposite direction to the conductor layer.

16. The suspension of claim 12 wherein each of the layers of the laminate are etched.

17. The suspension of claim 12 wherein the support layer is steel, the dielectric layer is a polymer, and the conductor layer is copper.

18. The suspension of claim 12 wherein the dielectric layer has a plurality of circular preformed voids.

* * * * *

UNITED STATES PATENT AND TRADEMARK OFFICE
CERTIFICATE OF CORRECTION

PATENT NO. : 6,533,950 B1  Page 1 of 1
DATED : March 18, 2003
INVENTOR(S) : Shum et al.

It is certified that error appears in the above-identified patent and that said Letters Patent is hereby corrected as shown below:

Column 1,
Line 15, please replace the "(ELS)" with -- (ILS) --.

Signed and Sealed this

Sixteenth Day of September, 2003

JAMES E. ROGAN
*Director of the United States Patent and Trademark Office*